(12) United States Patent
Bierl et al.

(10) Patent No.: US 7,637,150 B2
(45) Date of Patent: Dec. 29, 2009

(54) MEASURING DEVICE FOR RECORDING A GAS MASS FLOW

(75) Inventors: Rudolf Bierl, Regensburg (DE); Thorsten Knittel, Regensburg (DE); Stefan Pesahl, Saal A.D.Donau (DE); Frank Steuber, Bad Abbach (DE); Holger Weininger, Painten (DE)

(73) Assignee: Siemens VDO Automotive AG, Regensburg (DE)

( * ) Notice: Subject to any disclaimer, the term of this patent is extended or adjusted under 35 U.S.C. 154(b) by 116 days.

(21) Appl. No.: 11/893,788

(22) Filed: Aug. 16, 2007

(65) Prior Publication Data
US 2008/0041148 A1 Feb. 21, 2008

(30) Foreign Application Priority Data
Aug. 17, 2006 (DE) .................. 10 2006 038 596

(51) Int. Cl.
*G01M 15/04* (2006.01)

(52) U.S. Cl. .................. 73/114.32; 73/114.77
(58) Field of Classification Search .............. 73/114.31, 73/114.32, 114.33, 114.34, 114.36, 114.37, 73/114.77
See application file for complete search history.

(56) References Cited

U.S. PATENT DOCUMENTS

| 4,275,695 A | 6/1981 | Bauer et al. |
| 4,754,650 A | 7/1988 | Smalling et al. |
| 4,986,243 A | 1/1991 | Weissler, II et al. |
| 5,000,039 A | 3/1991 | Wright et al. |
| 6,955,080 B1 | 10/2005 | Verdejo |

*Primary Examiner*—Eric S McCall
(74) *Attorney, Agent, or Firm*—Cohen Pontani Lieberman & Pavane LLP

(57) ABSTRACT

Presented is a measuring device for recording a gas mass flow of an internal combustion engine. The measuring device includes a sensor element for recording the gas mass flow. The sensor element includes an evaluation circuit connected downstream of the sensor element. The evaluation circuit includes an adder for determining a total mass flow over a multiplicity of engine cycles.

13 Claims, 2 Drawing Sheets

MEASURING DEVICE FOR RECORDING A GAS MASS FLOW

BACKGROUND OF THE INVENTION

1. Field of the Invention

The invention relates to a measuring device for recording a gas mass flow of an internal combustion engine. The measuring device includes a sensor element which is used to record the gas mass flow and an evaluation circuit which is connected downstream of the sensor element.

2. Description of the Related Art

Such a measuring device is disclosed in U.S. Pat. No. 4,986,243. The known measuring device comprises a sensor element which is composed of a heating element and a temperature sensor. The current through the heating element is set in such a manner that the temperature difference between the heating element and the temperature sensor remains the same. In this case, the current flowing through the heating element is a measure of the air mass flow. Such measuring devices are generally arranged in the intake section of internal combustion engines in which an air/fuel mixture is caused to explode under compression. In this case, the power output from the internal combustion engine depends on the ratio of fuel mass to air mass. In order to control the engine, it is therefore very important to accurately determine the air mass which is drawn in.

Different aging effects which may result in signal distortion occur during operation of the known sensor elements. These aging effects may be caused by deposits of dirt or material drifts. Since the demands imposed on the level of pollution of the exhaust gas are becoming increasingly strict, the signal distortion due to the different aging effects cannot be accepted.

U.S. Pat. No. 4,754,650 also discloses a measuring device which can be used to determine the gas mass flow with the aid of ultrasound. Two ultrasound transducers which are opposite one another and emit an ultrasound signal that is transverse to the direction of flow of the gas mass flow are provided in the known measuring device. The propagation time of the ultrasound signal in the direction of flow and counter to the direction of flow can be used to infer the gas mass flow. This type of known measuring device is also subject to aging phenomena. So that the aging phenomena can be compensated for, the aging phenomena must be able to be quantitatively recorded.

SUMMARY OF THE INVENTION

An object of the present invention is to provide a measuring device for recording a gas mass flow, in which aging effects can be recorded.

The object is met by a measuring device for recording a gas mass flow, which includes an evaluation circuit with an adder which can be used to determine a total mass flow over a multiplicity of engine cycles. Since the instantaneous gas mass flow can be recorded using the measuring device, an adder which operates over a multiplicity of engine cycles can determine the total mass flow.

A variable for the operating time of the measuring device is thus available. The value of the variable can be used to infer the load on the measuring device. In this respect, the aging effects caused by the load on the measuring device can be estimated. If the measuring device has exceeded the permissible service life, the measuring device may be replaced if necessary.

In one preferred embodiment, an integrator which uses a measurement signal provided by the sensor element to determine an integrated partial mass flow over a predetermined interval of time is connected upstream of the adder. In this case, the adder only needs to add the mass flow values provided by the integrator in order to obtain the total mass flow. If the integrator operates over the entire operating time without interruption, the adder determines the actual total mass flow.

The adder can be set up to determine the total mass flow since the start of operation of the measuring device. This is particularly expedient when the adder forms a unit with the sensor element and can be interchanged with the latter. In this case, the aging of the unit can be recorded.

In addition, it is possible to design the adder such that it can be reset, which is particularly appropriate when the adder is part of a unit which is separate from the unit comprising the sensor element.

The sensor element may be a sensor element for thermal gas mass sensors or a sensor element that can be used to record the propagation time of switching signals in the gas mass flow. Both types of sensor elements are subject to aging phenomena, which can be recorded with the aid of the measuring device described here.

The gas mass sensor is finally an air mass sensor, which is suitable for recording the quantity of air supplied to an internal combustion engine.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters refer to the same parts throughout the different views. Also, the drawings are not necessarily to scale, emphasis instead generally being placed upon illustrating the principles of the invention.

DETAILED DESCRIPTION OF THE PRESENTLY PREFERRED EMBODIMENTS

Figure 1:
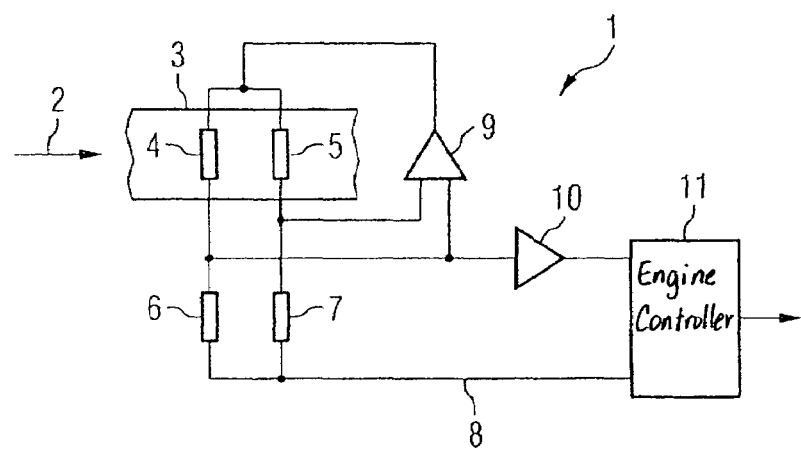
FIG. 1 is an illustrative schematic diagram of a thermal air mass sensor.

FIG. 1 shows an air mass sensor 1 which is used to determine an air mass flow 2 in an intake pipe 3. The air mass sensor 1 includes a heating resistor 4 and a measuring resistor 5 which are each connected to ground 8 via bridge resistors 6 and 7. The heating resistor 4 and the bridge resistor 6 as well as the measuring resistor 5 and the bridge resistor 7 respectively form voltage dividers of a measuring bridge. The partial voltages of the measuring bridge are supplied to the inputs of an operational amplifier 9. The output of the operational amplifier 9 sets the voltage applied to the voltage dividers in such a manner that the same partial voltages are produced. As a result, the current through the heating resistor 4 is regulated on the basis of the air mass flow 2. In this case, the heating current needed to heat the heating resistor 4 is greater, the greater the cooling of the heating resistor by the air mass flow 2. Since the heating current also flows through the bridge resistor 6, the partial voltage of the voltage divider formed by the heating resistor 4 and the bridge resistor 6 is a measure of the heating current flowing through the heating resistor 4. Therefore, an output voltage which is proportional to the heating current through the heating resistor 4 can be tapped off from an output amplifier 10 which taps off the partial voltage between the heating resistor 4 and the bridge resistor, said output voltage being supplied to an engine controller 11 for further processing. The measuring resistor 5 is also used to detect and compensate for the change in the temperature of the inflowing air.

Figure 2:
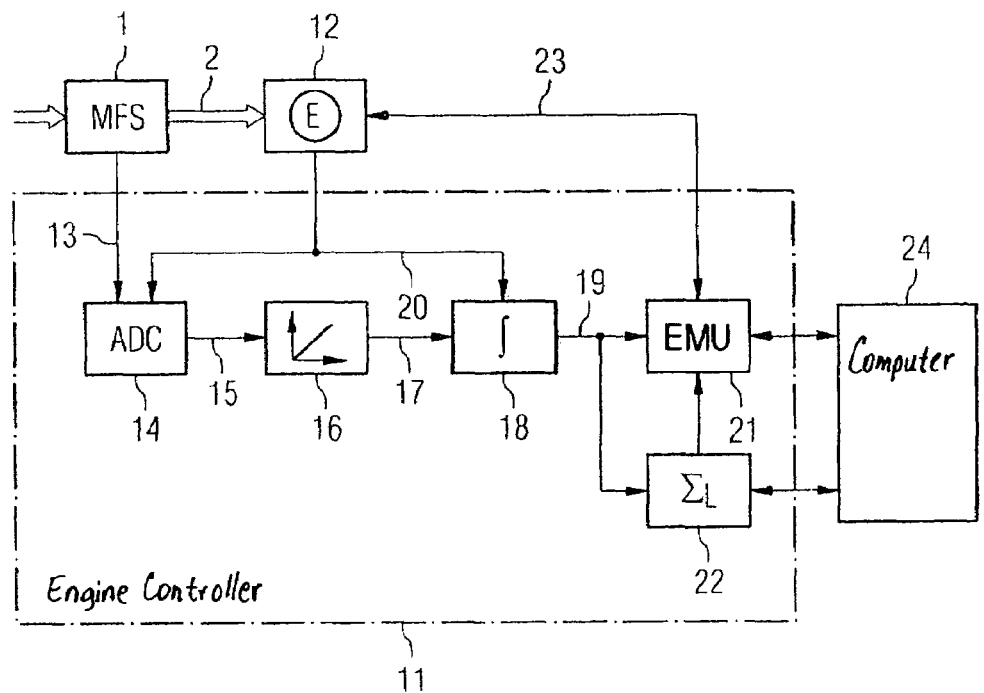
FIG. 2 is an illustrative block diagram of an engine controller.

FIG. 2 shows a block diagram of an engine controller 11 to which the air mass sensor 1 is connected. The engine controller 11 is used to control an engine 12. In order to control the engine 12, the engine controller 11 needs instantaneous values relating to the quantity of air taken in by the engine 12 in order to be able to set the ratio of fuel mass to air mass in accordance with the performance requirements.

For this purpose, an analog measurement signal 13 produced by the air mass sensor 1 is supplied to an analog/digital converter 14 which uses it to produce a digital measurement signal 15. The digital measurement signal 15 is supplied to a linearizer 16 which converts the digital measurement signal 15 into a linearized measurement signal 17 with the aid of a predetermined table. The linearized measurement signal 17 is supplied to an integrator 18 which uses it to produce an integrated measurement signal 19. Like the analog/digital converter 14, the integrator 18 is controlled by a position signal 20 from the engine 12. The position signal 20 may depend, for example, on the angular position of the crankshaft or camshaft. This makes it possible to determine the air mass drawn in during the intake phase of a cylinder.

The integrated measurement signal 19 is supplied, on the one hand, to an engine management unit 21 and, on the other hand, to an adder 22. The engine management unit 21 controls the engine 12 by determining, for example, the injection quantity and by appropriately controlling the injection valves. Information is exchanged in this case between the engine 12 and engine management unit 21 using control and data signals 23. The integrated measurement signals 19 are added in the adder 22. The sum value provided by the adder 22 is a measure of the total air mass flow which has been recorded by the air mass sensor 1. The total mass flow is in turn a measure of the age of the air mass sensor 1.

The counter reading of the adder 22 can be read by the engine management unit 21 and can be transmitted to an on-board computer 24. When a predetermined limit value for the sum value produced by the adder 22 is exceeded, the on-board computer 24 can make a servicing entry in a data memory indicating that the air mass sensor 1 has exceeded its permissible service life and should be replaced. The air mass sensor 1 can then be replaced when the engine 12 is next serviced. After the air mass sensor 1 has been replaced, the adder 22 can then be reset. In addition, the adder 22 can also be read directly by the on-board computer 24.

Figure 3:
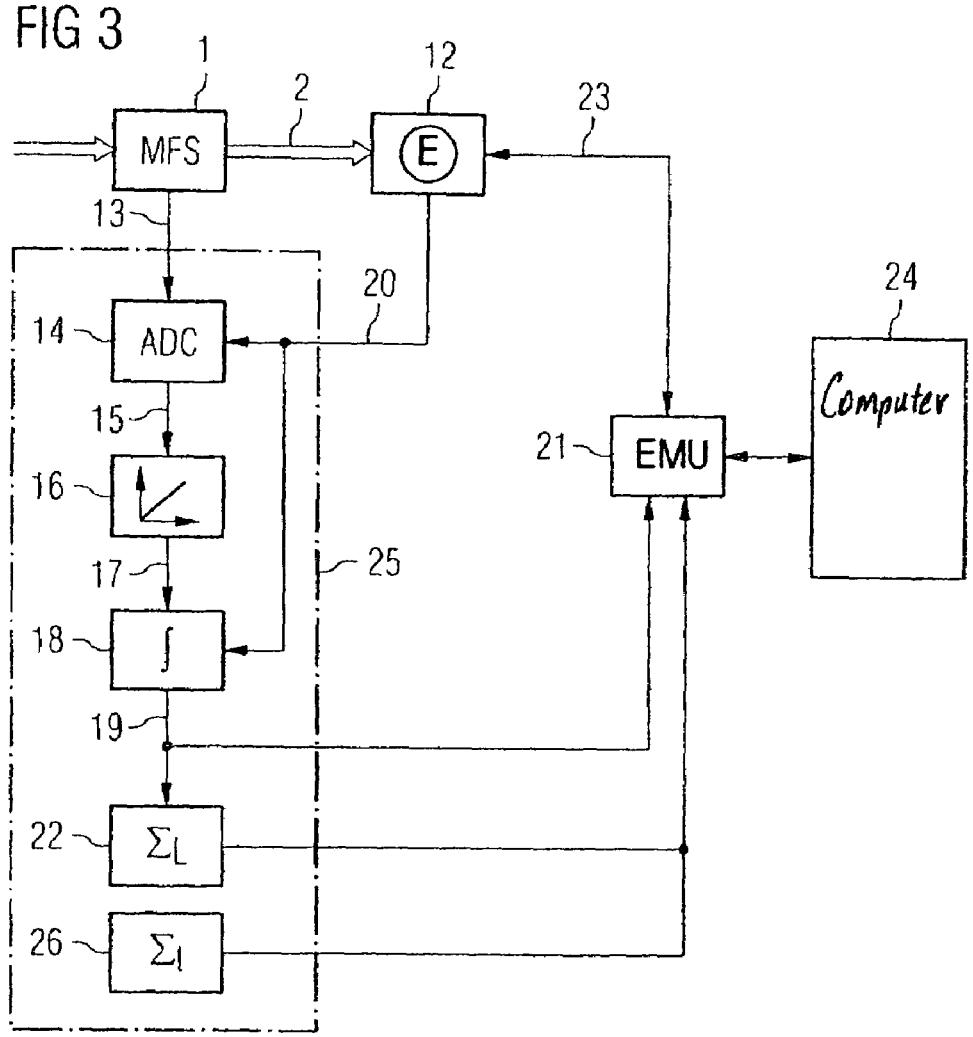
FIG. 3 is an illustrative block diagram of a sensor circuit.

FIG. 3 shows another modified exemplary embodiment in which the analog/digital converter 14, the linearizer 16, the integrator 18 and the adder 22 are part of a sensor circuit 25 which forms a unit with the air mass sensor 1. In this embodiment, the sensor circuit 25 is replaced together with the air mass sensor 1 when a predetermined limit is exceeded by the adder indicating that the permissible service life is exceeded. In the exemplary embodiment illustrated in FIG. 3, the sensor circuit 25 additionally comprises an operating hours counter 26 which, like the adder 22, can be read by the on-board computer 24 using the engine management unit 21.

Figure 4:
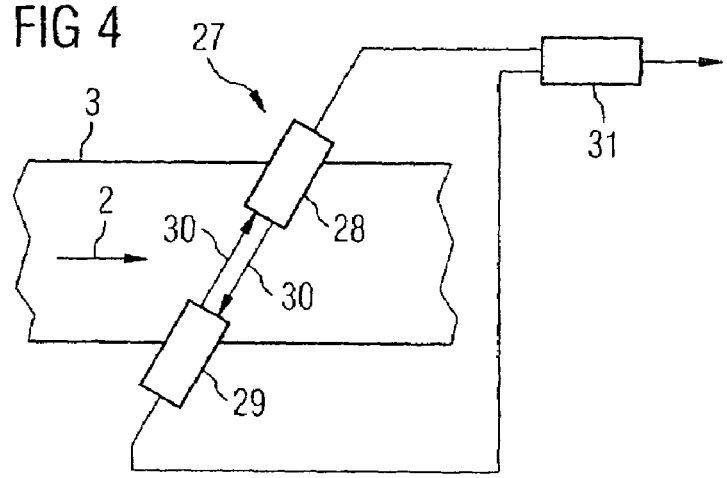
FIG. 4 is an illustrative schematic diagram of an air mass sensor, which operates, with the aid of ultrasound.

FIG. 4 shows another air mass sensor 27 which has ultrasound transducers 28 and 29. The ultrasound transducers 28 and 29 can emit ultrasound signals 30 in the direction of flow and counter to the direction of flow. The difference between the propagation times can then be used to infer the air mass flow 2. In order to determine the propagation time of the ultrasound signals 30, provision is made of a sensor circuit 31 which, like the sensor circuit 25, may be part of an engine controller 11 or else may form a unit with one of the ultrasound transducers 28 or 29 or else with both ultrasound transducers 28 and 29. The sensor circuit 31 may also be provided with an adder which adds the values determined for the air mass flow 2 to form a total air mass flow and in this manner produces a value that is characteristic of the operating time of the air mass sensor 27.

As a result of the fact that the total air mass flow is determined, the drift effects caused by contamination, corrosion or aging in air mass sensors can be corrected on the basis of the total quantity of air. This makes it possible to considerably improve the long-term stability of the air mass sensors 1 and 27. As a result, the quality of the measurement results provided by the air mass sensors 1 and 27 increases.

In addition, the servicing of parts of the engine 12 which are relevant to the quantity of air can be improved using the total quantity of air. For example, the point in time at which air filters or spark plugs should be replaced can be determined using the total quantity of air.

It should be noted that terms such as linearizer, integrator or adder denote functional units which can be set up both with the aid of hardware and with the aid of software. In this case, the corresponding functions need not necessarily be formed in a physical device. Rather, the corresponding functions may also be distributed over a plurality of physical units. For example, the functions described here may also be undertaken by the on-board computer 24.

It should also be pointed out that features and properties, which have been described in connection with a particular exemplary embodiment, may also be combined with another exemplary embodiment, except when this is precluded for reasons of compatibility.

Variations, modifications, and other implementations of what is described herein may occur to those of ordinary skill in the art without departing from the spirit and scope of the invention. Accordingly, the invention is not to be defined only by the preceding illustrative description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A measuring device for recording a gas mass flow of an internal combustion engine, comprising:
a sensor element configured to sense the gas mass flow and output a gas mass flow signal; and
an evaluation circuit connected downstream of the sensor element, the evaluation circuit comprising an adder determining a value indicative of a total gas mass flow over a multiplicity of engine cycles of the internal combustion engine wherein the value is a measure of an age of the sensor element.

2. The measuring device as claimed in claim 1, further comprising an integrator determining an integrated partial mass flow based on a rational position of the internal combustion engine, the integrator being connected upstream of the adder.

3. The measuring device as claimed in claim 2, wherein the adder adds values of the integrated partial mass flow provided by the integrator.

4. The measuring device as claimed in claim 1, wherein the adder determines a value indicative of the total mass flow over an operation life of the measuring device.

5. The measuring device as claimed in claim 1, wherein the adder is disposed in a unit with the sensor element.

6. The measuring device as claimed in claim 1, wherein the adder is resettable.

7. The measuring device as claimed in claim 1, wherein the adder is disposed in an engine controller.

8. The measuring device as claimed in claim 1, wherein the adder is disposed in a central computation unit of a vehicle.

9. The measuring device as claimed in claim 1, wherein the sensor element comprises a heating resistor and a measuring resistor configured to thermally determine the air mass flow.

10. The measuring device as claimed in claim 1, wherein the sensor element comprises at least one ultrasound transducer.

11. The measuring device as claimed in claim 1, wherein the measuring device measures the air mass flow in the intake section of an internal combustion engine.

12. The measuring device according to claim 1, wherein the evaluation circuit is configured to compare the value to a limit, the evaluation circuit outputting a signal indicative of a status of the sensor based in part on the comparison.

13. The measuring device according to claim 12, wherein the signal indicates a replacement sensor is required.

* * * * *